United States Patent
Li et al.

(10) Patent No.: US 8,775,859 B2
(45) Date of Patent: Jul. 8, 2014

(54) METHOD, APPARATUS AND SYSTEM FOR DATA DISASTER TOLERANCE

(75) Inventors: Lijuan Li, Shenzhen (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 13/592,913

(22) Filed: Aug. 23, 2012

(65) Prior Publication Data

US 2012/0324285 A1  Dec. 20, 2012

Related U.S. Application Data

(63) Continuation of application No. PCT/CN2010/080388, filed on Dec. 28, 2010.

(30) Foreign Application Priority Data

Feb. 24, 2010  (CN) .......................... 2010 1 0113255

(51) Int. Cl.
G06F 11/00 (2006.01)
G06F 11/14 (2006.01)
G06F 12/16 (2006.01)

(52) U.S. Cl.
CPC ............... *G06F 11/14* (2013.01); *G06F 12/16* (2013.01)
USPC ....................................................... 714/4.1

(58) Field of Classification Search
USPC ....................................................... 714/4.1
See application file for complete search history.

(56) References Cited

U.S. PATENT DOCUMENTS

| 5,555,404 | A | 9/1996 | Torbj et al. | |
| 2006/0168154 | A1* | 7/2006 | Zhang et al. | 709/220 |
| 2008/0192626 | A1* | 8/2008 | Yang | 370/225 |
| 2008/0209142 | A1 | 8/2008 | Obernuefemann | |
| 2008/0313242 | A1 | 12/2008 | Doerr | |
| 2010/0034206 | A1 | 2/2010 | Xue et al. | |
| 2010/0325476 | A1* | 12/2010 | Zhang et al. | 714/4 |
| 2012/0036394 | A1 | 2/2012 | Feng | |

FOREIGN PATENT DOCUMENTS

| CN | 1741489 A | 3/2006 |
| CN | 1921369 A | 2/2007 |
| CN | 101316184 A | 12/2008 |
| CN | 101539873 A | 9/2009 |
| CN | 101626563 A | 1/2010 |
| CN | 101763321 A | 6/2010 |

OTHER PUBLICATIONS

Chinese Patent No. 101763321 issued on Jan. 2, 2013, granted in corresponding Chinese Patent Application No. 201010113255.0.

(Continued)

*Primary Examiner* — Bryce Bonzo
(74) *Attorney, Agent, or Firm* — Brinks Gilson & Lione

(57) ABSTRACT

A method, apparatus and system for data disaster tolerance are provided in embodiments of this disclosure, the method comprising: receiving node failure information from a node; detecting along a predecessor direction and a successor direction of a failure node indicated in the node failure information according to a pre-stored node sequence to determine a first effective predecessor node and a first effective successor node, and all failure nodes between the first effective predecessor node and the first effective successor node; instructing those of all effective nodes that have local content registration index stored on the failure nodes and the first effective successor node to perform a primary index recovery process, respectively, so as to recover primary indexes of all of the failure nodes into the primary index of the first effective successor node.

19 Claims, 5 Drawing Sheets

(56) References Cited

OTHER PUBLICATIONS

International Search Report and Written Opinion of the International Searching Authority issued in corresponding PCT Patent Application No. PCT/CN2010/080388, mailed Mar. 24, 2011.

Office Action issued in corresponding Chinese Patent Application No. 201010113255.0, mailed Apr. 26, 2011.

Office Action issued in corresponding Chinese Patent Application No. 201010113255.0, mailed Apr. 12, 2012.

DeCandia et al., "Dynamo: Amazon's Highly Available Key-value Store" SOSP '07 Proceedings of twenty-first ACM SIGOPS symposium on Operating systems principles, 2007.

Jie et al., "Design and Implementation of Disaster Tolerant System Based on Internet" Application Research of Computers, vol. 24 No. 7, Jul. 2007.

\* cited by examiner

METHOD, APPARATUS AND SYSTEM FOR DATA DISASTER TOLERANCE

CROSS-REFERENCE TO RELATED APPLICATIONS

This application is a continuation of International Application No. PCT/CN2010/080388, filed on Dec. 28, 2010, which claims priority to Chinese Patent Application No. 201010113255.0, filed on Feb. 24, 2010, both of which are hereby incorporated by reference in their entireties.

FIELD

The present disclosure relates to data storage techniques, and more specifically, to a method, apparatus and system for data disaster tolerance.

BACKGROUND

Recently, with the development of network techniques and the wide spread of networks, data amount in the world has increased in an explosive manner. The amount of data is so huge that enterprises have to adopt mass data storage systems. At the same time, in order to provide superior services to clients, powerful security has become an extremely important aspect for those mass data storage systems. Such storage systems may incur inestimable losses even if they stop their services for 1 minute. Thus, a secure and reliable data disaster tolerance technique is highly desired.

A distributed structural storage architecture is commonly adopted in the prior art, wherein a distributed structural network is constructed by a plurality of nodes, each node maintains information about most other nodes, and a predefined protocol is configured to maintain the structural relation among those nodes, that is, each node randomly selects another node per second to send it a message to negotiate their records of system node variation with each other and update their node lists. Each node is responsible for managing a piece of index and arranges its backup on each of N consecutive and successor physical nodes.

However, the inventors of this disclosure have found that the prior art has at least the following issue: when node failure occurs, there is a possibility of unable to completely recover all index information that has been lost.

SUMMARY OF THE DISCLOSURE

A method, apparatus and system for data disaster tolerance are provided in embodiments of this disclosure. When node failure occurs in a storage system, the storage system can automatically recover all index information that has been lost.

The following solutions are adopted in embodiments of this disclosure.

A method for data disaster tolerance in a storage system, a primary index stored on each node of the storage system having backups on at least two consecutive successors, the method comprising:

receiving node failure information from a node;

detecting along a predecessor direction and a successor direction of a failure node indicated in the node failure information according to a pre-stored node sequence to determine a first effective predecessor node and a first effective successor node, and all failure nodes between the first effective predecessor node and the first effective successor node;

instructing those of all effective nodes that have local content registration index stored on the failure nodes and the first effective successor node to perform a primary index recovery process, respectively, so as to recover primary indexes of all of the failure nodes into the primary index of the first effective successor.

An apparatus for node management, comprising:

a receiving unit configured to receive node failure information from a node;

a first detecting unit configured to, according to a pre-stored node sequence, detect along a predecessor direction and a successor direction of a failure node indicated in the node failure information to determine a first effective predecessor node and a first effective successor node, and all failure nodes between the first effective predecessor node and the first effective successor node;

a first instructing unit configured to instruct all effective nodes that have local content registration index stored on the failure nodes and the first effective successor node to perform a primary index recovery process, respectively, so as to recover primary indexes of all of the failure nodes into the primary index of the first effective successor.

A storage system, comprising:

a node configured to store data, a primary index, and backup indexes of at least two predecessor nodes;

a node management apparatus configured to receive node failure information from the node; detect along a predecessor direction and a successor direction of a failure node indicated in the node failure information according to a pre-stored node sequence to determine a first effective predecessor node and a first effective successor node, and all failure nodes between the first effective predecessor node and the first effective successor node; instruct all effective nodes that have local content registration index stored on the failure nodes and the first effective successor node to perform a primary index recovery process, respectively, so as to recover primary indexes of all of the failure nodes into the primary index of the first effective successor.

According to the embodiments of this disclosure described in the above solutions, a primary index stored on each node of the storage system has backups on at least two consecutive successors. A node management apparatus, firstly, receives node failure information from a node, and then detects along a predecessor direction and a successor direction of a failure node indicated in the node failure information according to a pre-stored node sequence to determine a first effective predecessor node and a first effective successor node, and all failure nodes between the first effective predecessor node and the first effective successor node; after that instructs those of all effective nodes that have local content registration index stored on the failure nodes and the first effective successor node to perform a primary index recovery process, respectively, so as to recover primary indexes of all of the failure nodes into the primary index of the first effective successor. In the embodiments of this disclosure, primary indexes of all failure nodes can be recovered into the first effective successor, irrespective of the number of the failure nodes.

BRIEF DESCRIPTION OF THE DRAWINGS

For a more explicit description of solutions of embodiments of this disclosure or the prior art, a brief introduction of accompanying drawings to be used in the description of these embodiments and the prior art will be given below. Obviously, accompanying drawings described below are merely some embodiments of this disclosure, for those skilled in the art, other accompanying drawings can be derived from these ones without any creative efforts.

DETAILED DESCRIPTION OF THE PREFERRED EMBODIMENT

Hereinafter, a clear and complete description of solutions of embodiments of this disclosure will be given in connection with accompanying drawings of those embodiments. Obviously, embodiments described herein are merely some embodiments of this disclosure, but not all of them. Based on those embodiments of this disclosure, other embodiments can occur to those skilled in the art without any creative efforts, all of which falling within the scope of this disclosure.

Embodiment 1

Figure 1:
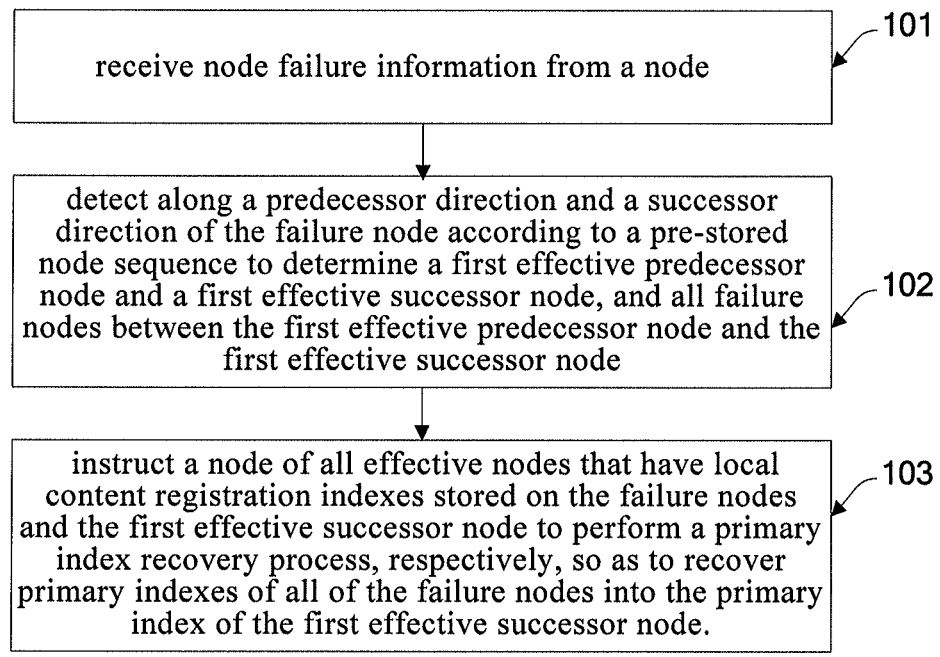
FIG. 1 is a flow chart of a method for data disaster tolerance in a storage system according to an embodiment 1.

A method for data disaster tolerance in a storage system is provided in this embodiment. Nodes of the storage system may form a distributed structural network. A primary index stored on each node of the storage system may have backups on at least two consecutive successor node, that is, each node stores a piece of primary index that is managed by the node, in addition to backup index nodes stored thereon by its at least two consecutive predecessor nodes. As shown in FIG. 1, when a node failure occurs, the method can realize data disaster tolerance through the following steps.

101. Receive information about node failure from a node. When an arbitrary node A accesses an arbitrary node B, if the node A finds out that the node B is unable to response to the access request, the node A may report to a node management apparatus of information about the failure node B. At that time, the node management apparatus may receive information about the node failure reported by the node A, which contains the failure node B.

102. The node management apparatus then detects along a predecessor direction and a successor direction of the failure node according to a pre-stored node sequence, to determine a first effective predecessor node, a first effective successor node and all the failure nodes between the first effective predecessor node and the first effective successor node.

Because the network forming a whole storage system is logically managed in domains, the domains can be divided according to geographic areas. All the nodes in the whole storage system can be divided into multiple domains. When each node is added into the storage system, it requests the node management apparatus to register the access information of that node, such as which domain of the storage system the newly added node belongs to, the predecessor node and successor node of the newly added node, etc. Each added node is stored in a list of effective nodes according to a pre-stored node sequence. Thereby, when the state of the node B that is reported as failure is confirmed as failure, the node management apparatus detects along a predecessor direction and a successor direction of the failure node B according to the pre-stored node sequence, to determine a first effective predecessor node, a first effective successor node, and all the failure nodes between the first effective predecessor node and the first effective successor node. All of the determined failure nodes are stored in a list of failure nodes.

103. After determining all of the failure nodes, instruct all effective nodes that have local content registration indexes stored on the failure nodes and the first effective successor node to perform a primary index recovery process, respectively, so as to recover the primary indexes of all the failure nodes into the primary index of the first effective successor node.

The node management apparatus may send an index variation message to the first effective successor node to instruct that when the first effective successor node is performing the primary index recovery process, if the failure nodes have backup indexes stored on the first effective successor node, the first effective successor node may take over the backup indexes of those failure nodes. On the other hand, the node management apparatus may send a failure node information to all the effective nodes, to instruct that those effective nodes having local content registration indexes stored on the failure nodes should perform the primary index recovery process, if there is a case that all the primary indexes of a failure node have been completely lost, the completely lost primary index can be re-registered on the first effective successor node by requesting index registration again. Thereby, no matter how many nodes have failed, primary indexes of the failure nodes can be recovered on the first effective successor node. Thus, a problem in the prior art can be addressed, that is, when there are three or more consecutive nodes have gone off-line, the index managed by one of them may be completely lost, causing a portion of data inaccessible.

Figure 2:
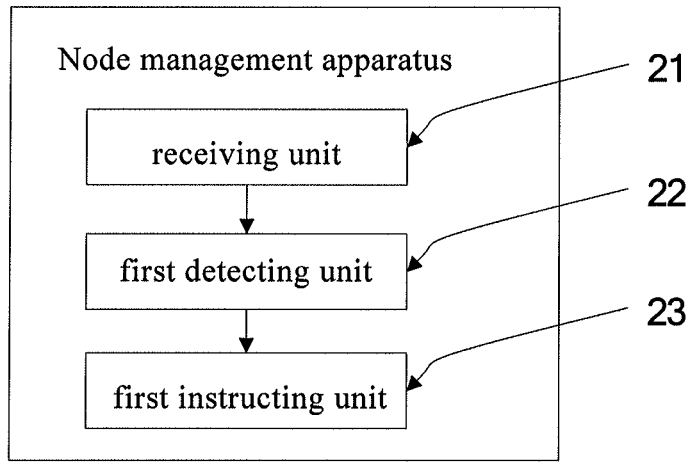
FIG. 2 is a block diagram of the structure of a node management apparatus according to the embodiment 1.

A node management apparatus is further provided in one embodiment of this disclosure. As shown in FIG. 2, the apparatus comprises: a receiving unit 21, a first detecting unit 22, and a first instructing unit 23.

Wherein, the receiving unit 21 is configured to receive node failure information from the nodes. After the state of a node that is reported as failure has been confirmed as failure, the first detecting unit 22 detects along a predecessor direction and a successor direction of the failure node according to the pre-stored node sequence, to determine a first effective predecessor node, a first effective successor node and all the failure nodes between the first effective predecessor node and the first effective successor node. The first instructing unit 23 is configured to instruct all effective nodes that have local content index registration stored on the failure nodes and the first effective successor node to perform a primary index recovery process, respectively, so as to recover primary indexes of all the failure nodes into the primary index of the first effective successor node.

When the primary index recovery process are being performed respectively by the nodes of all the effective nodes that have local content index registration stored on the failure nodes and the first effective successor node, depending on the loss condition of the primary index of a failure node, the process can be performed in different manners as follows. The node management apparatus may send an index variation message to the first effective successor node. If the primary indexes of the failure nodes have backup indexes stored on the first effective successor node, the first effective successor node may take over the backup indexes of those failure nodes. On the other hand, the node management apparatus may send a failure node information to all the effective nodes to instruct that when those effective nodes, among all the effective nodes, having local content registration indexes stored on the failure nodes are performing the primary index recovery process, if there is a case that all the primary index of the failure nodes have been completely lost, the completely lost primary indexes can be re-registered on the first effective successor node by requesting index registration again. Thereby, no matter how many nodes have failed, primary indexes of all the failure nodes can be recovered on the first effective successor node. Thus, a problem in the prior art can be addressed, that is, when there are three or more consecutive nodes have gone off-line, the index managed by one of them may be completely lost, causing the portion of data inaccessible.

Figure 3:
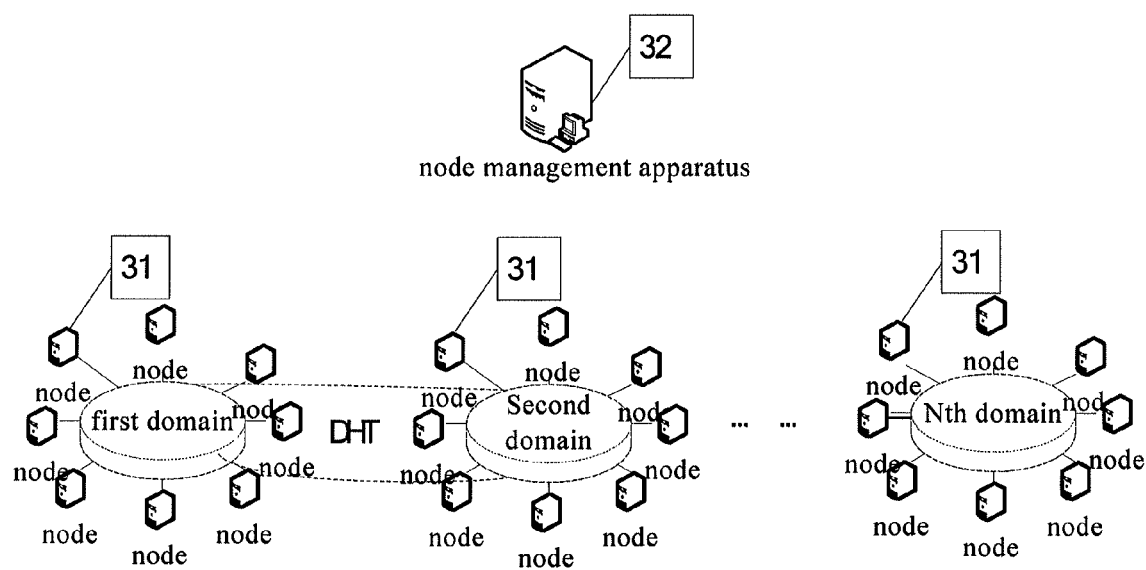
FIG. 3 is a structural diagram of a storage system according to the embodiment 1.

Correspondingly, a storage system is further provided in one embodiment of this disclosure. As shown in FIG. 3, the system comprises nodes 31 and a node management apparatus 32.

Wherein, each of the nodes 31 is configured to store data, a primary index, and backup indexes of at least two consecutive predecessor nodes. The node management apparatus 32 is configured to receive node failure information from a node, and detect along a predecessor direction and a successor direction of a failure node indicated in the node failure information according to a pre-stored node sequence to determine a first effective predecessor node and a first effective successor node, and all failure nodes between the first effective predecessor node and the first effective successor node, instruct the node of all effective nodes that have local content registration index stored on the failure nodes and the first effective successor node to perform a primary index recovery process respectively, so as to recover primary indexes of all of the failure nodes into the primary index of the first effective successor node. Thereby, when multiple nodes fail, it can be realized by the storage system to automatically recover all index information that has been lost.

Embodiment 2

Figure 4:
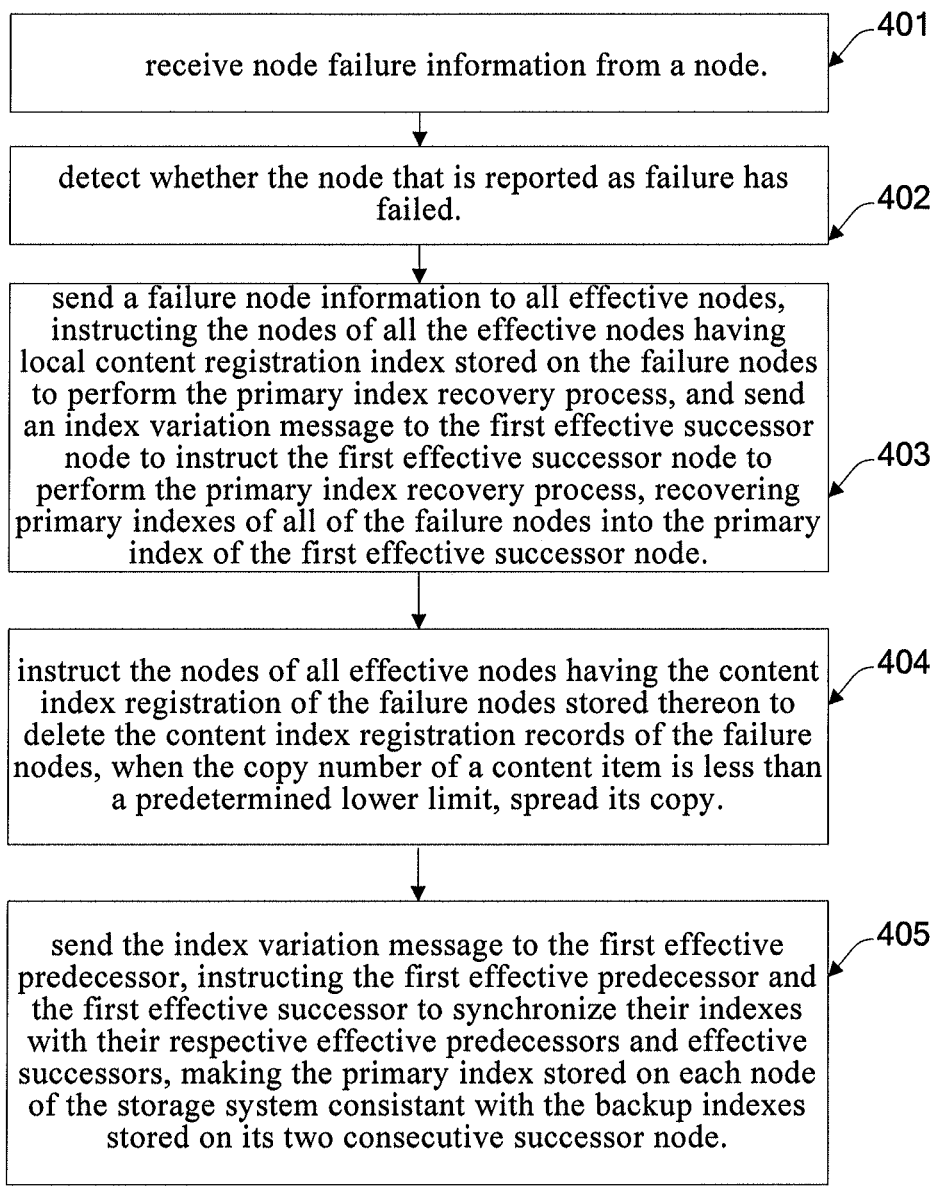
FIG. 4 is a flow chart of a method for data disaster tolerance in a storage system according to an embodiment 2.

A method for data disaster tolerance in a storage system is provided in this embodiment. Nodes of the storage system may form a distributed structural network in an application scenario, such as: a primary index stored on each node of the storage system has backups on its two consecutive successors, that is, each node stores a piece of primary index that the node is responsible for management, in addition to backup index nodes stored thereon by its two consecutive predecessor nodes. As shown in FIG. 4, when a node failure occurs, the method can realize data disaster tolerance through the following steps.

401. Receive node failure information from a node. When any node A accesses any node B, if it is found that the node B cannot respond to the access request, the node A may report to a node management apparatus of information about the failure node B. At that time, the node management apparatus may receive the information reported by the node A, which contains node failure of the failure node B.

402. The node management apparatus then detects whether the node that is reported as failure has failed. Because in the prior art, a node B is considered as a failure node if any node A sending a message to the node B does not get a response, even if the node B can respond to the request of another node C. In order to address the inaccurate decision of the failure state of a node, through employing the node management apparatus to further verify whether a reported failure node B has failed, this embodiment can find and verify a failure node as soon as possible, so that a measure can be adopted for a rapid recovery.

After the failure state of the node B that is reported as failure is verified, the node management apparatus detects along a predecessor direction and a successor direction of the failure node according to a pre-stored node sequence to determine a first effective predecessor node and a first effective successor node, and all failure nodes between the first effective predecessor node and the first effective successor node.

Because the network forming a whole storage system is logically managed in domains, which are divided according to geographic areas, all nodes of the whole storage system can be divided into multiple domains. When each node is added into the storage system, it requests the node management apparatus to register access information of that node, such as which domain of the storage system the newly added node belongs to, the predecessor node and successor node of the newly added node, etc. Each added node is stored in a list of effective nodes according to a pre-stored node sequence. Thereby, when the failure state of a node B that is reported as failure is verified, the node management apparatus detects along a predecessor direction and a successor direction of the failure node B according to the pre-stored node sequence to determine a first effective predecessor node and a first effective successor node, and all failure nodes between the first effective predecessor node and the first effective successor node. All of the determined failure nodes are stored in a list of failure nodes.

403. after determining all failure nodes, the node management apparatus instructs the nodes of all effective nodes that have local content registration indexes stored on the failure nodes and the first effective successor node to perform a primary index recovery process respectively, so as to recover primary indexes of all of the failure nodes into the primary index of the first effective successor node. In a particular implementation, the node management apparatus may send a failure node information to all effective nodes, instructing nodes of all effective nodes having local content registration index stored on the failure nodes to perform the primary index recovery process, and may send an index variation message to the first effective successor node, instructing the first effective successor node to perform the primary index recovery process.

In the application scenario of this embodiment, a primary index stored on each node of the storage system has backups on its at least two consecutive successors. Depending on the number of failure nodes, this step can be divided into two sub-steps (not shown) to perform index recovery for failure nodes.

403A: when the number of the failure nodes is one or two, the primary indexes of the failure nodes all have backup indexes stored on the first effective successor node. The node management apparatus may send an index variation message to the first effective successor node, instructing the first effective successor node to merge all backup indexes stored by all of the failure nodes into the primary index of the first effective successor node. At that point, the first effective successor node takes over the primary indexes of all of the failure nodes. Then, the node management apparatus sent a failure node information to all the effective nodes, instructing all effective nodes to modify index node information corresponding to their local contents registered in indexes on those failure nodes to the first effective successor node. The node failure information can be notified to a predetermined access node in each domain respectively, and then the predetermined access node instructs all of other effective nodes in its domain to modify index node information corresponding to their local contents registered in indexes on those failure nodes to the first effective successor node.

403B: when the number of the failure nodes is larger than two, for example, three consecutive failure nodes, because the last two failure nodes have backup indexes stored on the first effective successor node, the node management apparatus instructs the first effective successor node to merge the backup indexes stored thereon by the last two failure nodes into the primary index of the first effective successor node, and instruct all effective nodes to modify index node information corresponding to their local contents registered in indexes on those failure nodes to the first effective successor node. The node failure information can be notified to a predetermined access node in each domain respectively, and then the predetermined access node instructs all of other effective nodes in its domain to modify index node information corresponding to their local contents registered in indexes on those failure nodes to the first effective successor node.

As for three consecutive failure nodes, the node except the last two failure nodes has its primary index backed up on the last two failure nodes that have failed, and thus the primary index of that node has completely lost. In this embodiment, all effective nodes are instructed to request the first effective successor node to re-register as an index their local contents that have been registered in indexes on the failure node except the last two failure nodes. Thereby, the load of the node management apparatus can be reduced. At that point, the first effective successor node not only takes over those indexes that have been backed up thereon, but also has the index that has been completely lost recovered on the first effective successor node.

Thus, a problem in the prior art can be solved, that is, when there are three or more consecutive nodes off-line, the index managed by one of them may be completely lost, causing a portion of data inaccessible.

404. After recovering all primary indexes managed by the failure nodes on the first effective successor node, the node management apparatus further instructs nodes of all effective nodes having the content index registration stored thereon to delete the content index registration records of the failure nodes. Because the contents of each node is registered in the primary index of another node, when a node has failed, the content index registration records of the failure node should be deleted from the node where it is registered. The node failure information can be notified to a predetermined access node in each domain, predetermined access node then sends instructions to all of other effective nodes in its domain.

Then, it is determined whether the number of copy of a content item corresponding to a deleted index registration record is less than a predetermined lower limit. When an content item is stored, its corresponding copies are stored on other nodes, the lower limit of the copy of each content item can be determined depending on a specified security level and its access hotness over a period of time. For example, the number of copy in the above storage system is three as default, generally, two copies in the domain from which the content item is uploaded, and one in another domain. First, if the security level of a content item is 3, the lower limit of copy number of the content item is 3, and the upper limit is 6. Second, the copy number can be determined depending on the access hotness of the current content item. When the access hotness is high, the system can automatically spread a copy in a hot region until the upper limit is reached, and delete the copy(s) when the access hotness is low.

When the copy number is less than a predetermined lower limit, a copy will be spread, that is, a copy produced by replicating the content item will be stored on any other node.

405. After recovering the primary indexes managed by all of the failure nodes on the first effective successor node, the index variation message described above also should be sent to the first effective predecessor that have been detected. Because at step 403, the node management apparatus has sent the index variation message to the first effective successor, at that point, it is only need to send the index variation message to the detected first effective predecessor. In a particular implementation, the node management apparatus can send the index variation message to the first effective predecessor and the first effective successor simultaneously or separately. The node management apparatus can instruct the first effective predecessor and the first effective successor to synchronize their indexes with their respective effective predecessors and effective successors, making the primary index stored on each node of the storage system consistent with the backup indexes on its two consecutive successor node.

The index variation message at least comprises: a list of sequential failure nodes and the number thereof, information of the current effective predecessor and effective successor, and a task of backing up lost backup indexes on new effective successor nodes by the effective predecessor.

In the application scenario of this embodiment, the primary index stored on each node of the storage system has backups on two consecutive successor nodes. Depending on the different number of failure nodes, this step can be particularly divided into two sub-steps for the index synchronization of the failure node.

405A: when the number of the failure nodes is one, after receiving the index variation message, the first effective predecessor requests to back up a second backup index on a second effective successor. Then, it sends an index variation message to its effective predecessor, i.e., a second effective predecessor, to instruct the second effective predecessor to modify its second backup index node to the first effective successor node, and then request to back up the second backup index on the first effective successor node, so as to realize index synchronization of the first effective predecessor and the second effective predecessor.

At that point, according to the received index variation message, the first effective successor sets a second backup index stored thereon by the first effective predecessor as its first backup index, and then instructs its first effective successor, that is, the second effective successor node to merge a second backup index stored thereon by the failure node into its first backup and request index synchronization with a third effective successor node. Thus, index synchronization between the first effective successor and its effective predecessor, i.e., the first effective predecessor, and index synchronization between the first effective successor and its effective successor, i.e., the second effective successor and the third effective successor can be realized.

405B: when there are two or more failure nodes, according to the received index variation message, the first effective predecessor requests to back up its first backup index on the first successor node, requests to back up its second backup index on the second effective successor node, and then sends a index variation message to the second effective predecessor to instruct the second effective predecessor to change its second backup index node to the first effective successor node, and request to back up its second backup index to the first effective successor node.

At that point, the first effective successor, according to the received index variation message, notifies the second effective successor node to merge the second backup index stored thereon by a failure node into its first backup, and then performs index synchronization. The third effective successor node is requested to synchronize its indexes. After index synchronization, the primary index stored on each node is consistent with the backup indexes stored on its two consecutive successor nodes.

Figure 5:
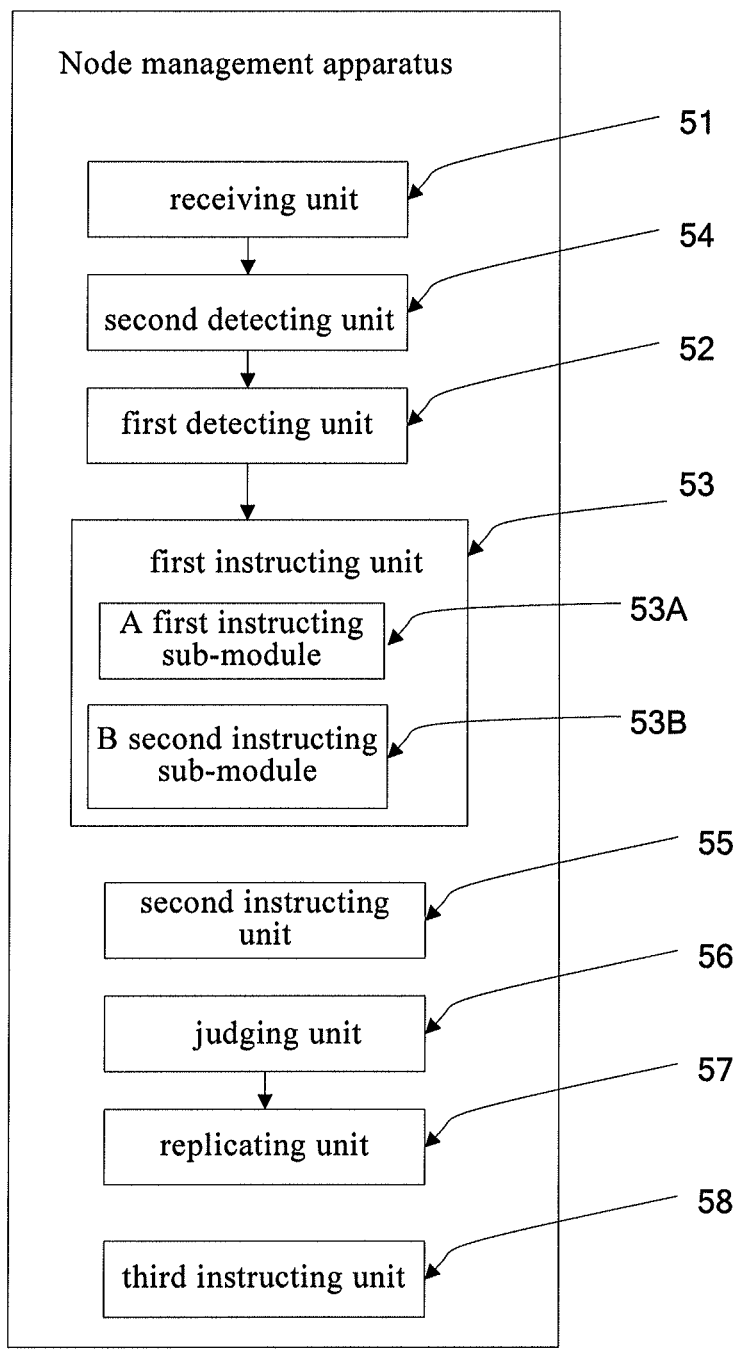
FIG. 5 is a block diagram of the structure of a node management apparatus according to the embodiment 2.

In order to realize the above method, a node management apparatus is further provided in the embodiment of this disclosure, as shown in FIG. 5, the apparatus comprising: a receiving unit 51, a first detecting unit 52, a first instructing unit 53, a second detecting unit 54, a second instructing unit 55, a determining unit 56, a replicating unit 57, and a third instructing unit 58.

Wherein the receiving unit 51 is configured to receive node failure information from a node, and the second detecting unit 54 is configured to detect whether a node that is reported as failure has failed. The first detecting unit 52 is configured to, according to a pre-stored node sequence, detect along a predecessor direction and a successor direction of the failure node to determine a first effective predecessor node and a first effective successor node, and all failure nodes between the first effective predecessor node and the first effective successor node.

The first instructing unit 53 comprises: a first instructing sub-module 53A and a second instructing sub-module 53B.

The first instructing sub-module 53A is configured to, when the number of failure nodes is not larger than 2, instruct the first effective successor to merge backup indexes stored thereon by all of the failure nodes into the primary index of the first effective successor; and instruct all effective nodes to change index node information corresponding to their local contents that have been registered in indexes on the failure nodes to the first effective successor. The second instructing sub-module 53B is configured to, when the number of failure nodes is larger than 2, instruct the first effective successor to merge the backup indexes stored thereon by last two of the failure nodes into the primary index of the first effective successor, and instruct all effective nodes to change index node information corresponding to their local contents that have been registered in indexes on the failure nodes to the first effective successor; instruct all effective nodes to request index registration again, on the first effective successor node, their local contents that have been registered in indexes on the failure nodes except the last two failure nodes.

Then, the second instructing unit 55 is configured to instruct those of all the effective nodes that have content index registration stored on the failure nodes to delete content index registration records of the failure nodes. The determining unit 56 is configured to determine whether the number of copy of a content item corresponding to a deleted content index registration record is less than a predetermined lower limit. The replicating unit 57 is configured to spread a copy when the copy number is less than the predetermined lower limit.

The third instructing unit 58 is configured to send an index variation message to the first effective predecessor and the first effective successor that have been detected, instruct them to synchronize indexes with their respective effective predecessors and effective successors, so at to make the primary index stored on each node of the storage system consistent with the backup indexes stored on its two consecutive successor nodes.

Depending on the loss of the primary indexes of the failure nodes, the first instructing unit 53, when instructing those of all effective nodes having index registration of their local contents on the failure nodes, and the first effective successor node to perform primary index recovery respectively, can perform the process in the following different manners.

The types of nodes and the node management apparatus in this embodiment may be: a computer, a server, a router, a base station, etc.

In a particular implementation, the node management apparatus may send an index variation message to the first effective successor node. If the primary index of the failure nodes have backup indexes stored on the first effective successor, the first effective successor may take over the backup indexes of those failure nodes; on the other hand, the node management apparatus may send a failure node information to all effective nodes, instructing those effective nodes having local content index registration stored on the failure nodes to perform the primary index recovery process, if all copies of the primary index of a failure node have been completely lost, the completely lost primary index can be re-registered on the first effective successor through requesting index re-registration. Thereby, no matter how many nodes have failed, primary indexes of failure nodes can be recovered on the first effective successor. Thus, a problem in the prior art can be addressed, that is, when there are three or more than three consecutive nodes off-line, an index managed by one of them may be completely lost, causing a portion of data inaccessible.

Figure 6:
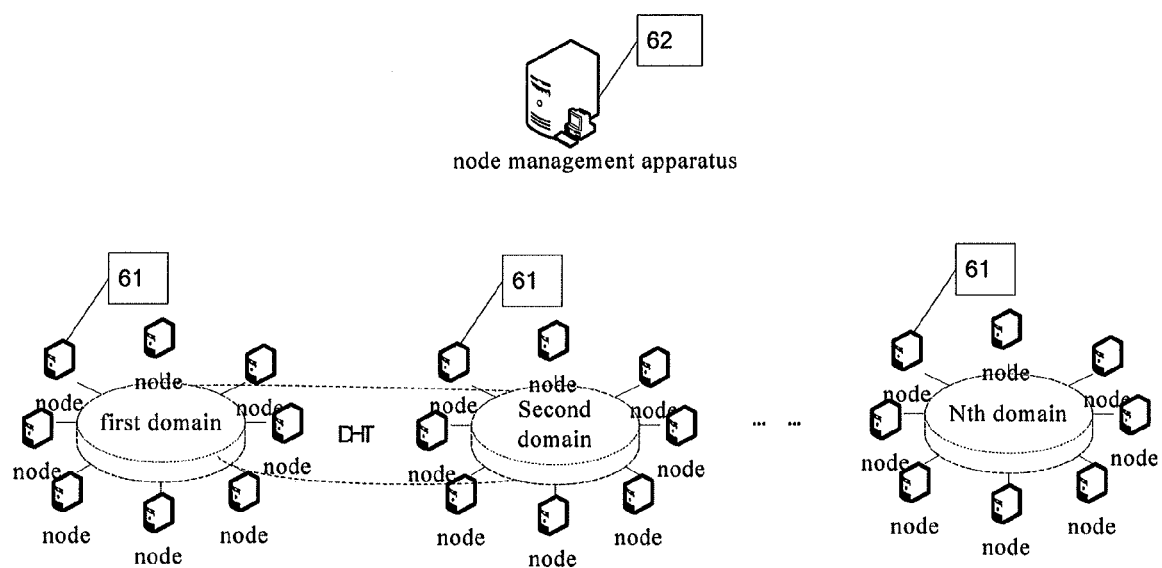
FIG. 6 is a structural diagram of a storage system according to the embodiment 2.

Correspondingly, a storage system is further provided in the embodiment of this disclosure, as shown in FIG. 6, the system comprising: nodes 61 and a node management apparatus 62. The nodes of the storage system may form a distributed structural network.

Wherein, each of the nodes 61 is configured to store data, a primary index, and backup indexes of at least two consecutive predecessor nodes. The node management apparatus 62 is configured to receive node failure information from a node, and detect along a predecessor direction and a successor direction of a failure node indicated in the node failure information according to a pre-stored node sequence to determine a first effective predecessor node and a first effective successor node, and all failure nodes between the first effective predecessor node and the first effective successor node, instruct those of all effective nodes that have local content index registration stored on the failure nodes and the first effective successor node to perform a primary index recovery process respectively, so as to recover primary indexes of all of the failure nodes into the primary index of the first effective successor node. Thereby, when multiple nodes fail, it can be realized by the storage system to automatically recover all index information that has been lost.

The embodiment of this disclosure is mainly applied in mass structural storage systems. In case of failures occurred in multiple nodes or even an entire domain leading to failure of multiple consecutive nodes, the storage system can recover automatically to realize data disaster tolerance. No human intervention is needed during the entire process.

The types of nodes and the node management apparatus in this embodiment may be: a computer having a processor, a server having at least one processor, a router having a processor, a base station having a processor and trans-receivers, etc.

Through the description of above embodiments, those skilled in the art may clearly understand that this disclosure can be implemented in software plus necessary general-purpose hardware, certainly, in hardware also, but in most cases, the former is more preferable. Based on such understanding, the solution of this disclosure in nature, or in other words, those parts representing contribution to the prior art, can be embodied in a software product stored in a readable storage medium, such as, floppy disk, hard disk, optical disk, etc, which comprises instructions causing a computing device (PC, server, network device, etc) to perform methods of various embodiments of this disclosure.

Description above is merely particular implementations of this disclosure, and the scope of this disclosure is not limited thereto. Any those skilled in the art can easily conceive modifications or alternations within the scope disclosed in this disclosure, which should be covered in the scope of this disclosure. Thus, the scope of this disclosure should coincide with the scope of accompanying claims.

What is claimed is:

1. A method implemented in a storage system, wherein a primary index stored on each node of the storage system has backups on at least two consecutive successor nodes, and the method comprises:

receiving node failure information from a node;

detecting along a predecessor direction and a successor direction of a failure node indicated in the node failure information according to a pre-stored node sequence to determine a first effective predecessor node and a first effective successor node, and all failure nodes between the first effective predecessor node and the first effective successor node;

instructing all effective nodes having local content registration index stored on the failure nodes and the first effective successor node to perform a primary index recovery process that recovers primary indexes of all of the failure nodes into the primary index of the first effective successor.

2. The method according to claim 1, further comprising detecting whether a failure node indicated in the node failure information has failed; wherein, detecting along a predecessor direction and a successor direction of a failure node indicated in the node failure information according to a pre-stored node sequence comprises: when the failure node indicated in the node failure information is detected as failure, detecting along a predecessor direction and a successor direction of the failure node according to a pre-stored node sequence.

3. The method according to claim 2, wherein all nodes of the storage system are divided into at least one domain; the method of instructing all effective nodes comprises:

notifying a predetermined access node in each domain of the node failure information, and then instructing all of other effective nodes in each domain by the predetermined access node in its domain.

4. The method according to claim 1, wherein a primary index stored on each node of the storage system has backups on its N consecutive successor nodes, N is larger than or equal to 2;

wherein instructing all effective nodes having local content index registration stored on the failure nodes and the first effective successor node to perform a primary index recovery process that recovers primary indexes of all of the failure nodes into the primary index of the first effective successor node comprises:

when the number of the failure nodes is not large than N, instructing the first effective successor to merge all backup indexes stored thereon by all of the failure nodes into the primary index of the first effective successor; and instructing all effective nodes to change index node information corresponding to their local contents that have been registered in indexes on the failure nodes to the first effective successor node;

when the number of the failure nodes is larger than N, instructing the first effective successor to merge the backup indexes stored thereon by last N failure nodes of the failure nodes into the primary index of the first effective successor, and instructing all effective nodes to change index node information corresponding to their local contents that have been registered in indexes on the failure nodes to the first effective successor node; instructing all effective nodes to request index registration again, on the first effective successor node, their local contents that have been registered in indexes on failure nodes except the last N failure nodes.

5. The method according to claim 4, wherein all nodes of the storage system are divided into at least one domain; the method of instructing all effective nodes comprises:

notifying a predetermined access node in each domain of the node failure information, and then instructing all of other effective nodes in each domain by the predetermined access node in its domain.

6. The method according to claim 1, wherein the method further comprises:

instructing those of all effective nodes having the index of the contents of the failure nodes registered thereon to delete the content index registration records of the failure nodes;

determining whether the copy number of a content item corresponding to the deleted content index registration record is less than a predetermined lower limit;

spreading the copy when the copy number is less than the predetermined lower limit.

7. The method according to claim 6, wherein all nodes of the storage system are divided into at least one domain; the method of instructing all effective nodes comprises:

notifying a predetermined access node in each domain of the node failure information, and then instructing all of other effective nodes in each domain by the predetermined access node in its domain.

8. The method according to claim 1, wherein all nodes of the storage system are divided into at least one domain; the method of instructing all effective nodes comprises:

notifying a predetermined access node in each domain of the node failure information, and then instructing all of other effective nodes in each domain by the predetermined access node in its domain.

9. The method according to claim 1, further comprising:

instructing the detected first effective predecessor and first effective successor to perform index synchronization with their respective effective predecessor and effective successor, such that the primary index stored on each node of the storage system is consistent with the backup indexes stored on its at least two consecutive successor node.

10. A node management apparatus having a processor, comprising:

a receiving unit, configured to receive, by the processor, node failure information from a node having a processor;

a first detecting unit configured to, according to a pre-stored node sequence, detect, in the processor, along a predecessor direction and a successor direction of a failure node indicated in the node failure information to determine a first effective predecessor node and a first effective successor node, and all failure nodes between the first effective predecessor node and the first effective successor node;

a first instructing unit configured to instruct those of all effective nodes that have local content registration index stored on the failure nodes and the first effective successor node to perform a primary index recovery process respectively, so as to recover primary indexes of all of the failure nodes into the primary index of the first effective successor.

11. The node management apparatus according to claim 10, wherein the node management apparatus further comprises:

a second detecting unit configured to detect whether a node that is indicated as failure has failed; wherein, the first detecting unit is configured to, when the failure node indicated in the node failure information is detected as failure, detect along the predecessor direction and the successor direction of the failure node according to the pre-stored node sequence.

12. The node management apparatus according to claim 11, wherein all nodes of the storage system to which the node management apparatus belongs are divided into at least one domain; the first instructing unit and the second instructing unit are both configured to notify a predetermined access node in each domain of the node failure information; and the predetermined access node indicates all of other effective nodes in its domain.

13. The node management apparatus according to claim 10, wherein a primary index stored on each node of the storage system where the node management apparatus belongs to has backups on its N consecutive successor nodes, N is larger than or equal to 2, the first instructing unit comprises:
a first instructing sub-module configured to, when the number of failure nodes is not larger than N, instruct the first effective successor to merge backup indexes stored thereon by all of the failure nodes into the primary index of the first effective successor; and instruct all effective nodes to change index node information corresponding to their local contents that have been registered in indexes on the failure nodes to the first effective successor node;
a second instructing sub-module configured to, when the number of failure nodes is larger than N, instruct the first effective successor to merge the backup indexes stored thereon by last two of the failure nodes into the primary index of the first effective successor, and instruct all effective nodes to change index node information corresponding to their local contents that have been registered in indexes on the failure nodes to the first effective successor; instruct all effective nodes to request index registration again, on the first effective successor, their local contents that have been registered in indexes on the failure nodes except the last N failure nodes.

14. The node management apparatus according to claim 13, wherein all nodes of the storage system to which the node management apparatus belongs are divided into at least one domain; the first instructing unit and the second instructing unit are both configured to notify a predetermined access node in each domain of the node failure information; and the predetermined access node indicates all of other effective nodes in its domain.

15. The node management apparatus according to claim 10, further comprising:
a second instructing unit configured to instruct those of all the effective nodes having content of the failure nodes registered thereon to delete content index registration records of the failure nodes;
a determining unit configured to determine whether the copy number of a content item corresponding to a deleted content index registration record is less than a predetermined lower limit;
a replicating unit configured to spread a copy when the copy number is less than the predetermined lower limit.

16. The node management apparatus according to claim 15, wherein all nodes of the storage system to which the node management apparatus belongs are divided into at least one domain; the first instructing unit and the second instructing unit are both configured to notify a predetermined access node in each domain of the node failure information; and the predetermined access node indicates all of other effective nodes in its domain.

17. The node management apparatus according to claim 10, wherein all nodes of the storage system to which the node management apparatus belongs are divided into at least one domain; the first instructing unit and the second instructing unit are both configured to notify a predetermined access node in each domain of the node failure information; and the predetermined access node indicates all of other effective nodes in its domain.

18. The node management apparatus according to claim 10, wherein the node management apparatus further comprises:
a third instructing unit configured to instruct the detected first effective predecessor and first effective successor to perform index synchronization with their respective effective predecessors and effective successors, such that the primary index stored on each node of the storage system consistent with the backup indexes stored on its two consecutive successor node.

19. A storage system, comprising
a node having a processor, configured to store data, a primary index, and backup indexes of at least two predecessor nodes;
a node management apparatus configured to receive node failure information from the node; detect along a predecessor direction and a successor direction of a failure node indicated in the node failure information according to a pre-stored node sequence to determine a first effective predecessor node and a first effective successor node, and all failure nodes between the first effective predecessor node and the first effective successor node; instruct those of all effective nodes that have local content registration index stored on the failure nodes and the first effective successor node to perform a primary index recovery process that recovers primary indexes of all of the failure nodes into the primary index of the first effective successor.

* * * * *